(No Model.) 2 Sheets—Sheet 1.
R. F. NICHOLS, Sr.
MOTOR.
No. 479,570. Patented July 26, 1892.
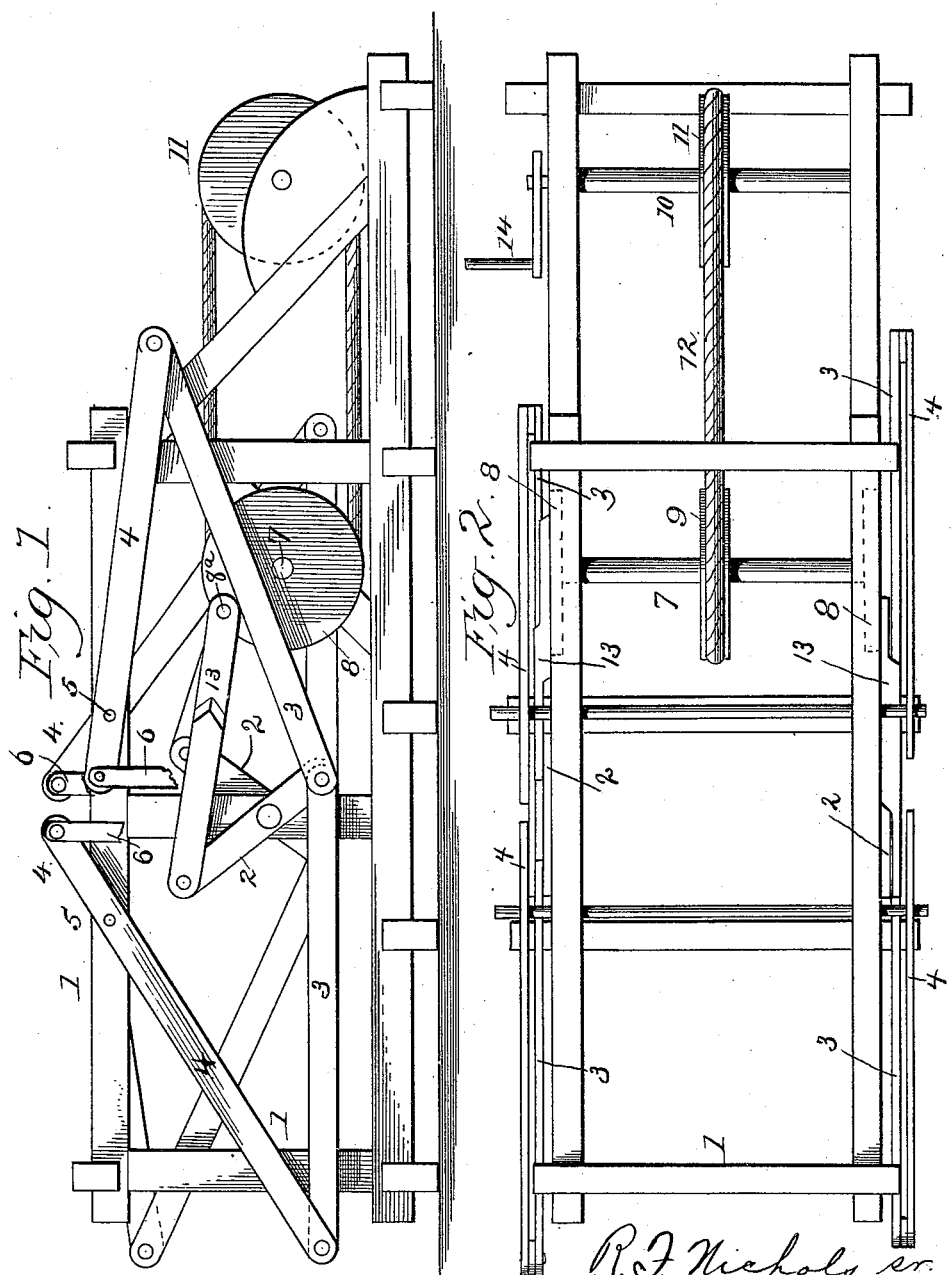

(No Model.) 2 Sheets—Sheet 2.
R. F. NICHOLS, Sr.
MOTOR.
No. 479,570. Patented July 26, 1892.
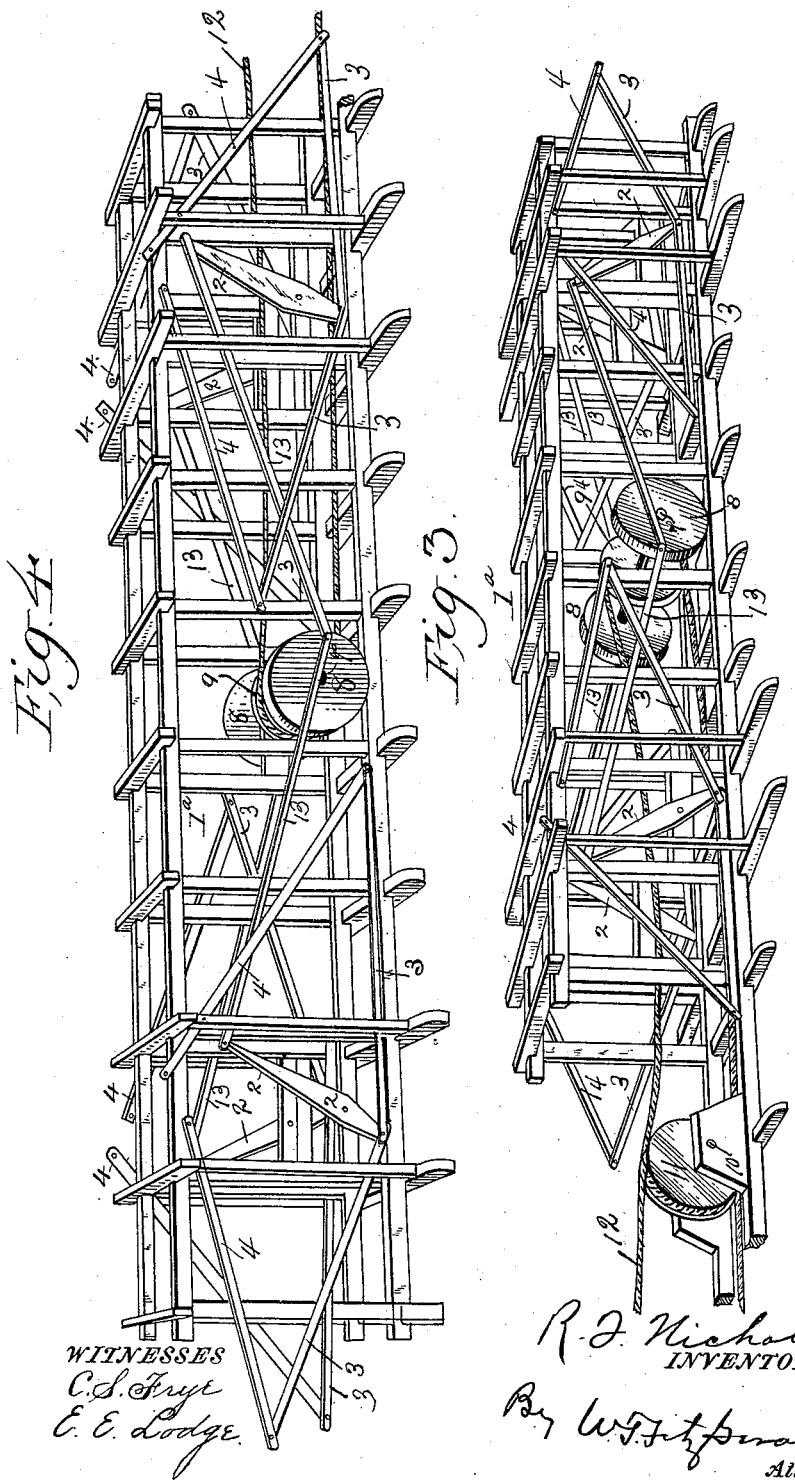
WITNESSES
C. S. Fry
E. E. Lodge
R. F. Nichols, Sr.,
INVENTOR
By W. F. Fitzgerald
Attorneys

UNITED STATES PATENT OFFICE.

ROBERT FLEETWOOD NICHOLS, SR., OF ALTURAS, CALIFORNIA.

MOTOR.

SPECIFICATION forming part of Letters Patent No. 479,570, dated July 26, 1892.

Application filed October 8, 1891. Serial No. 408,184. (No model.)

*To all whom it may concern:*

Be it known that I, ROBERT FLEETWOOD NICHOLS, Sr., a citizen of the United States, residing at Alturas, in the county of Modoc and State of California, have invented certain new and useful Improvements in Motors; and I do hereby declare the following to be a full, clear, and exact description of the invention, such as will enable others skilled in the art to which it appertains to make and use the same.

My invention has relation to improvements in apparatus for actuating pump-pistons and the like; and it has for its general object to convert a rotary motion into a reciprocatory one in such a manner that a great leverage may be exerted upon a piston rod or rods and the same actuated with the exercise of but a slight effort on the part of the operator.

To the attainment of the foregoing and other objects, the invention consists in the peculiar construction, certain novel combinations, and the adaptation of parts hereinafter described, and particularly pointed out in the claims appended.

In the accompanying drawings, Figure 1 is a side elevation of my improved apparatus. Fig. 2 is a plan view of the same, and Figs. 3 and 4 are two parts of a perspective view illustrating a multiplicity of my improved apparatus.

Referring by figure to the said drawings, and more particularly to Figs. 1 and 2 thereof, 1 indicates the main frame of my improved apparatus, which may be of any form and construction suitable to the purposes of my invention. Pivotally connected at intermediate points in their length to opposite sides of the frame 1 are vibrating levers 2, which are preferably of the proportional length illustrated. Journaled in the main frame 1, adjacent to the pivotal point of the levers 2, is a transverse rotary shaft 7, which carries crank-wheels 8 at its respective ends and a fixed pulley 9 at an intermediate point in its length. Journaled in the main frame at a suitable distance from the shaft 7 is another transverse rotary shaft 10, which is rotated through the medium of a crank 14 or the like and is provided at an intermediate point in its length with a pulley 11, around which takes an endless belt 12, which also takes around the pulley 9 of the shaft 7 and serves to transmit motion to said shaft. Pivotally connected to wrist-pins 8$^a$, carried by the crank-wheels 8, off the center thereof, are the ends of pitmen 13, which are pivotally connected at their opposite ends to the upper ends of the vibrating levers 2, whereby it will be perceived that when the shafts 10 and 7 are rotated said levers will be vibrated.

Pivotally connected at intermediate points of their length to each side of the frame 1 above the lever 2 are two vibrating levers 4, which are pivotally connected at their inner ends to piston-rods 6 or the like, as illustrated. Pivotally connected to the outer ends of the levers 4 are the ends of links 3, which are pivotally connected at their opposite ends to the lower ends of the vibrating levers 2, whereby it will be readily perceived that when said levers 2 are vibrated, as before described, the vibratory motion will be transmitted to the levers 4 through the medium of the links 3 and the piston-rods 6 will be vertically reciprocated.

From the foregoing description it will be readily perceived that I have provided an exceedingly cheap and simple apparatus, through the medium of which motion may be transmitted from a rotary shaft to one or more pump-pistons or the like and a great leverage be exerted on said pistons with the exercise of but a slight effort on the part of the operator turning the crank or drive shaft 10.

In Figs. 3 and 4 of the drawings I have illustrated in two parts a main frame 1$^a$, similar in construction to the frame illustrated in Figs. 1 and 2, but of a much greater length. In this frame 1$^a$ I have arranged a crank or drive shaft 10 between two of the shafts 7 and have connected the shaft 10 to the shafts 7 by a belt 12, similar to that shown in Figs. 1 and 2, whereby it will be seen that when the shaft 10 is rotated the shafts 7, which carry crank-wheels 8 at their respective ends, will also be rotated. In conjunction with each of the crank-wheels 8 of each of the shafts 7 I employ two vibrating levers 2, which are pivotally connected to the sides of the frame and are arranged at opposite points with respect to said wheels, with which they are connected by pitmen 13, whereby it will be seen that each of the crank-wheels carried by the shafts 7 serve to actuate or vibrate two of the levers 2, and each shaft 7 through the medium of its two crank-wheels serves to vibrate or actuate four of the levers 2, or two on each side of the frame. Connected by links 3 to the lower ends of each of the levers 2 are two levers 4, which are pivotally connected at an intermediate point in their length to the frame, and each are pivotally connected at their upper and inner ends to a piston-rod 6, as illustrated.

By the arrangement and multiplicity of the apparatus, as shown in Figs. 3 and 4 of the drawings, it will be readily perceived that the rotation of the drive-shaft 10 rotates two shafts 7 and through the medium of the crank-wheels carried by each shaft 7 and the two pitmen connected to each crank-wheel vibrates eight levers 2, and as each lever 2 through the medium of two links 3 vibrates two levers 4, which respectively carry a piston-rod 6, it will be readily perceived that the rotation of the drive-shaft reciprocates sixteen piston-rods.

By reason of the leverage described it will be readily perceived that the exercise of but little effort is necessary on the part of the operator turning the shaft 10, and when it is desirable to drive said shaft by an engine one of very small horse-power may be employed.

Having thus described my invention, what I claim, and desire to secure by Letters Patent, is—

1. In an apparatus for actuating pump-pistons and the like, the combination, with the main frame and a piston-rod, of the lever 4, pivotally connected to the frame at an intermediate point in its length and pivotally connected at its upper end to the piston-rod, the vibrating lever 2, pivotally connected to the frame at an intermediate point of its length, a link 3, connecting the lower ends of the levers 2 and 4, a transverse rotary shaft carrying a crank-wheel 8 at one end, a pitman 13, pivotally connected at one end to the crank-wheel 8, off the center thereof, and pivotally connected at its opposite end to the upper end of the vibrating lever 2, and a suitable means for rotating the rotary shaft carrying the crank-wheel, substantially as specified.

2. In an apparatus for actuating pump-pistons and the like, the combination, with the main frame and two piston-rods, of the levers 4, pivotally connected to the frame at an intermediate point in their length and pivotally connected at their upper ends to the piston-rods, the vibrating lever 2, pivotally connected to the frame at an intermediate point of its length, the links 3, connecting the lower end of the lever 2 and the lower ends of the levers 4, a transverse rotary shaft carrying a crank-wheel 8 at one end, a pitman 13, pivotally connected at one end to the crank-wheel 8, off the center thereof, and pivotally connected at its opposite end to the upper end of the vibrating lever 2, and a suitable means for rotating the rotary shaft carrying the crank-wheel, substantially as specified.

3. In an apparatus for actuating pump-pistons and the like, the combination of the main frame, the transverse shafts 7, journaled in the main frame and carrying fixed pulleys, a crank-wheel 8, fixed on the ends of the respective shafts 7, the levers 4, pivotally connected to the main frame on opposite sides of each crank-wheel, the piston-rods pivotally connected to the upper ends of the levers 4, the vibrating levers 2, pivotally connected to the main frame on opposite sides of each crank-wheel, the links 3, connecting the lower ends of the levers 2 and the lower ends of the levers 4, the pitmen 13, pivotally connected at one end to the crank-wheels 8, off the center thereof, and pivotally connected at their opposite ends to the upper ends of the vibrating levers 2, the drive-shaft 10, arranged between the shafts 7 and carrying a pulley-wheel, an endless belt taking around the pulley-wheel of the shafts 7 and 10, and a suitable means for rotating said shafts 10, substantially as and for the purpose set forth.

In testimony whereof I affix my signature in presence of two witnesses.

ROBERT FLEETWOOD NICHOLS, SR.

Witnesses:
C. L. CLAFLIN,
S. W. PEPPERDINE.